US007577663B2

(12) United States Patent
Crispo et al.

(10) Patent No.: US 7,577,663 B2
(45) Date of Patent: Aug. 18, 2009

(54) DISTRIBUTED DATABASE SYSTEMS AND METHODS

(75) Inventors: Richard J. Crispo, Newcastle, WA (US); Edward G. Stanley, Bainbridge Island, WA (US); Patrick J. Chambers, Kent, WA (US); Dennis N. Barr, Burien, WA (US); Bruce A. Dike, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 11/171,154

(22) Filed: Jun. 29, 2005

(65) Prior Publication Data

US 2007/0005574 A1 Jan. 4, 2007

(51) Int. Cl.
G06F 7/00 (2006.01)
G06F 17/30 (2006.01)
(52) U.S. Cl. .................. 707/10; 707/1; 707/103 X
(58) Field of Classification Search .............. 707/1–10, 707/100–104.1, 200–206; 715/513, 234
See application file for complete search history.

(56) References Cited

U.S. PATENT DOCUMENTS

| 5,995,961 A | 11/1999 | Levy et al. |
| 6,055,515 A * | 4/2000 | Consentino et al. ........... 705/27 |
| 2005/0065922 A1 | 3/2005 | Miller et al. |

OTHER PUBLICATIONS

Daniele Braga et al., A Graphical Environment to Query XML Dat with XQuery, IEEE, 2003, 31-40.*

Maozhen et al., An XML-based component model for wrapping legacy codes as Java/CORBA components, May 14-17, 2000, IEEE, vol. 1, 507-512.*

Smith, et al., A case for meta-interworking: projecting CORBA metadata into COM, Nov. 23-26, 1998, IEEE, 242-253.*

Nguyen, Dung T., UpdatePart interface Control Document (ICD); Ace DPD Integration Team, Future Combat Systems; pp. 24, Aug. 2004.

Park, Young S., "CreateFCSIPTDocument Interface Control Document", ACE DPD Integration Team, Future Combat Systems, pp. 21, Jun. 2005.

Park, Young S., CreateEVMSDocument Interface Control Document (ICD); ACE DPD Integration Team, pp. 20, Jun. 2005.

Stanley, Edward G., "ACE Distributed Transaction Architecture", ACE DPD Integration Team, pp. 13, Oct. 2003.

Lehman, Louis R., GetFileContent Interface Control Document (ICD); ACE DPD Integration Team, pp. 23, Aug. 2004.

(Continued)

Primary Examiner—Jean B Fleurantin

(57) ABSTRACT

Systems and methods for distributed database management are disclosed. In an embodiment, a method of accessing information in a distributed database system having one or more data servers includes establishing a plurality of lattice structures configured to store data elements having inter-related information. A data query initiated by a client is then formulated that includes selected data attributes. The data query is processed to generate a query product, and the plurality of lattice structures are searched to identify data elements corresponding to elements in the query product. Pertinent data files located within another data server are accessed that correspond to the data query and generating a result, and the result is transferred to the initiating client system.

17 Claims, 4 Drawing Sheets

OTHER PUBLICATIONS

Lehman, Louis R., EVMSSupplierRobot Interface Control Document (ICD); ACE DPD Integration Team, pp. 21, Sep. 2004.

Vu, Tuyen Q., CreateProduct Interface Control Document (ICD); ACE DPD Integration Team, pp. 23, Nov. 2004.

Benatallah, et al., "Data Sharing on the Web", Enterprise Distributed Object Computing Workshop, EDOC, IEEE Computing Soc., Oct. 24, 1997, pp. 258-269.

Doraiswamy, et al., "Reweaving the Tapestry: Integrating Database and Messaging Systems in the Wake of New Middleware Technologies", Data Management in a Connected World, Lecture Notes in Computer Science, LNCS, vol. 3551, 2005, pp. 91-109.

Fox, et al., "Harvesting: Broadening the Field of Distributed Information Retrieval", SIGIR 2003 Ws Distrbuted IR. LNCS, 2003, pp. 1-20.

Iyengar, "A Universal Repository Architecture Using the OMG UML and MOF", Enterprise Distributed Object Computing Workshop, 1998 Proceedings, Second International, Nov. 3-5, 1998, IEEE, pp. 35-44.

PCT Intl Search Report and Written Opinion for Application No. PCT/US2006/022662, dated Sep. 21, 2007, 13 pgs.

Sheth, et al., "Federated Databases Systems for Managing Distributed, Heterogeneous, and Autonomous Databases", ACM Computing Surveys (CSUR), Sep. 1990, vol. 22, Issue 3, pp. 183-236, Retrieved on Mar. 2, 2000, from <<http://www.acm.org/pubs/contents/journals/surveys/1990-22-3/p183-sheth/p183-sheth.pdf>>.

Turner, et al., "Using Web Service Technologies to Create an Information Broker: an Experience Report", Software Engineering, 2004, ICSE 2004 Proceedings, 26th International Conference, May 23-28, 2004, IEEE, pp. 552-561.

* cited by examiner

DISTRIBUTED DATABASE SYSTEMS AND METHODS

GOVERNMENT LICENSE RIGHTS

This invention was made with Government support under U.S. Government contract DAAE07-03-9-F001 awarded by the U.S. Army and Defense Advanced Research Projects Agency (DARPA). The Government has certain rights in this invention.

FIELD OF THE INVENTION

This invention relates generally to information systems and, more specifically, to systems and methods for data base management and integration.

BACKGROUND OF THE INVENTION

Databases are widely used to store and manage information. Briefly, and in general terms, a database is a collection of related information related to a particular subject that is organized in a useful manner that allows a database user to search for selected information, and to retrieve the information. In one known variation, which is commonly known as a distributed database, the information storage is distributed throughout a plurality of storage sites that are coupled by a communications network. In many present distributed database systems, the information resides in disparate database systems that exist within distinct geographical and/or corporate boundaries, which presents a challenge to database designers and managers. Advantageously, each database user should have the ability to search and access selected information within the disparate databases with the same performance and functionality.

Referring now to FIG. 1, a distributed database system 10 according to the prior art is shown. The system 10 includes a plurality of data servers, or "federated" systems 12 that operably maintain information that is exclusively controlled by a selected one of the data servers 12. For example, one of the data servers 12 may be controlled by a governmental agency, while another one of the data servers 12 may be controlled by a private organization. The data servers 12 may further include a secure portion 14 and a public portion 16 that are separated by a firewall structure 18. In general, each of the disparate data servers 12 may require different authentication procedures, access control procedures, or require other protocols and/or procedures that are unique to a selected data server 12. Accordingly, agents 20 are positioned between the data servers 12 and a middleware infrastructure 22 to allow information sharing between the plurality of data servers 12. The agents 20 may, for example, include adaptors, brokers or message queues as are understood by those skilled in the art. The middleware infrastructure 22 may manage the transaction between the various data servers 12, and may accelerate client requests by generally reducing the overall number of resource-expensive connections that occur during an information exchange. The middleware infrastructure 22 may also communicate with an applications infrastructure 24 that provides applications access to the various data servers 12.

One drawback associated with the foregoing distributed database system 10 is that the middleware infrastructure 22 and/or the agents 20 are typically difficult and expensive to maintain. Moreover, changes or alterations to the middleware infrastructure 22 and/or the agents 20 may not be properly communicated to each of the data servers 12, so that transactions between various clients 8, or between a selected data servers 12 and the applications infrastructure 24, may occur without notice.

Another drawback associated with the foregoing database system 10 involves data access in general. For example, if a selected one of the clients 8 initiates a search for desired information content that may reside on one of the data servers 12, the search must generally include searching each of the data servers 12 to find the desired information. The foregoing procedure is necessarily time-consuming and may occupy significant resources of the system 10 before the desired information is located.

Still another drawback associated with the database system 10 of FIG. 1 is that a user may be required to repeatedly enter authentication data as the access request moves throughout the system 10. For example, the user may be required to enter a variety of passwords or authentication codes at various times during the access request.

Although desirable results have been achieved, new systems and methods for distributed database management that may have reduced cost and improved searching efficiency would have utility.

SUMMARY

The present invention is directed to systems and methods for distributed database management. Embodiments of systems and methods in accordance with the invention may have reduced cost and improved searching efficiency in comparison with the prior art. In one aspect, a method of accessing information in a distributed database system having one or more data servers includes establishing a plurality of lattice structures configured to store data elements having interrelated information. A data query of a selected data server is then formulated that includes selected data attributes. The data query is processed to generate a query product, and the plurality of lattice structures are searched to identify data elements corresponding to elements in the query product. Pertinent data files located within another data server are accessed that correspond to the data query and generating a result, and the result is transferred to a selected client.

BRIEF DESCRIPTION OF THE DRAWINGS

Preferred and alternate embodiments of the present invention are described in detail below with reference to the following drawings.

DETAILED DESCRIPTION

The present invention relates to systems and methods for distributed data base management. Many specific details of certain embodiments of the invention are set forth in the following description and in FIGS. 2 through 4 to provide a thorough understanding of such embodiments. One skilled in the art, however, will understand that the present invention may have additional embodiments, or that the present invention may be practiced without one or more of the details described in the following description.

Figure 1:
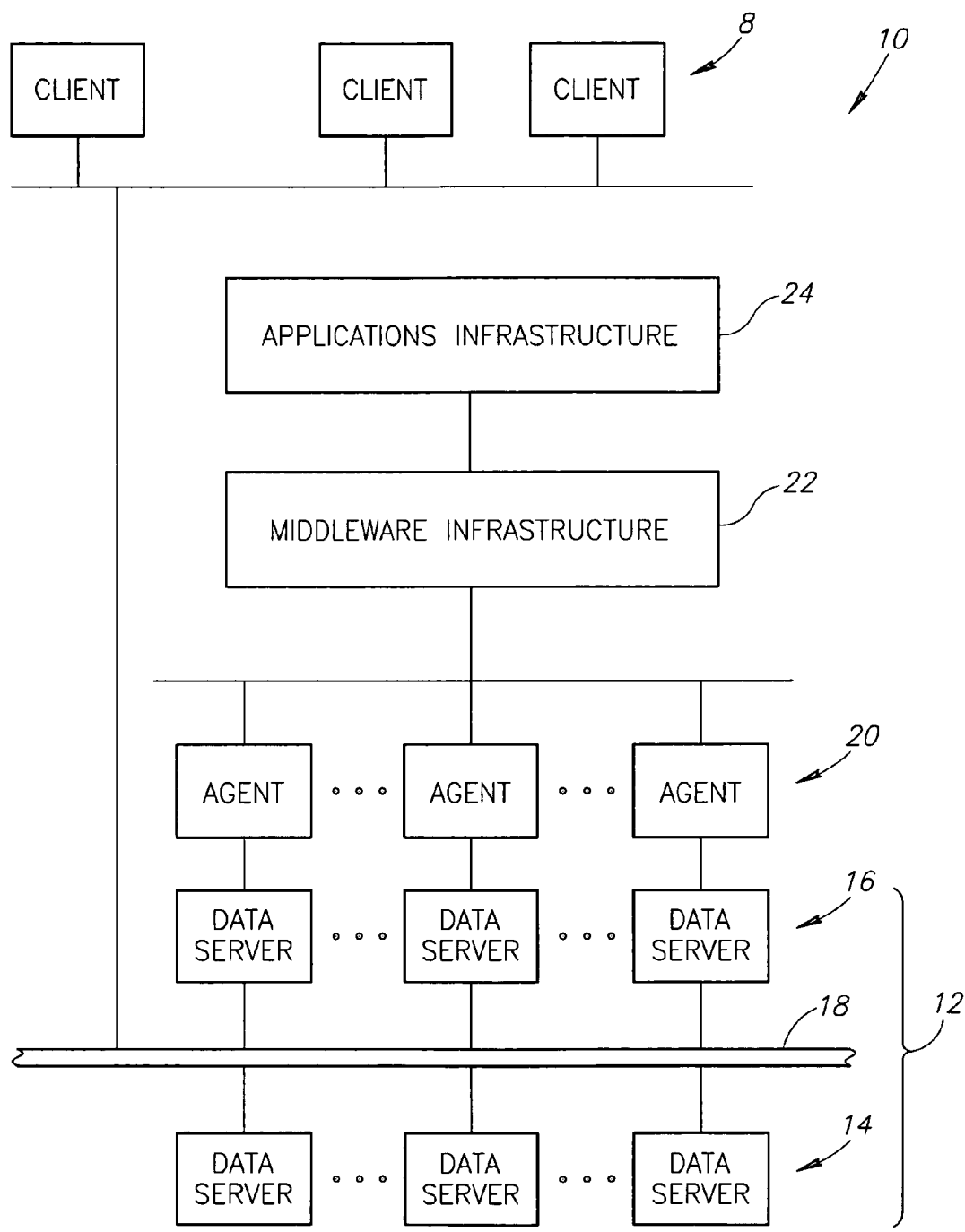
FIG. 1 is a schematic block view of a distributed database system according to the prior art.
Figure 2:
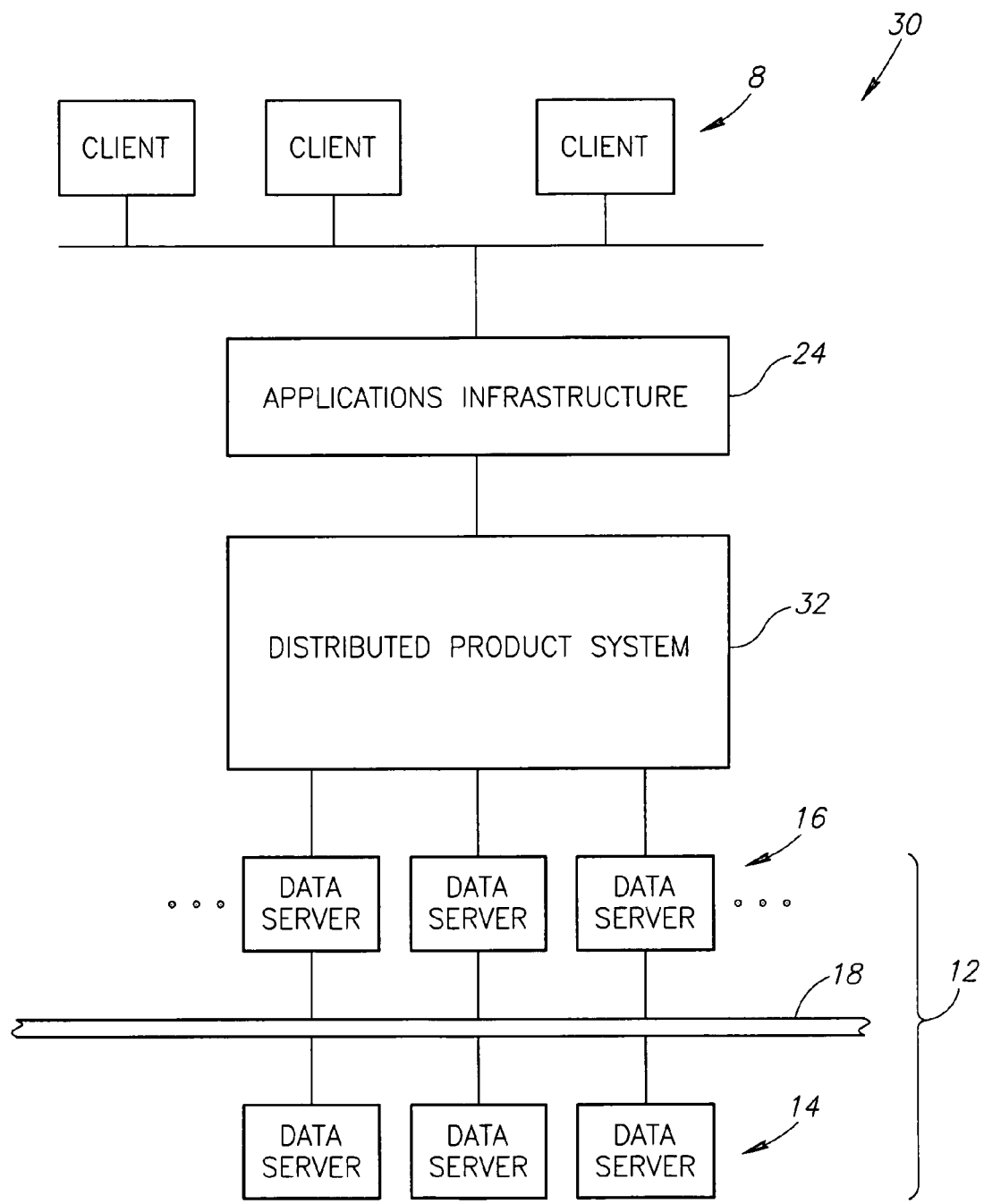
FIG. 2 is a schematic block view of a distributed database management system according to an embodiment of the invention.

FIG. 2 is a schematic block view of a distributed database management system 30 according to an embodiment of the invention. The distributed database management system 30 includes one or more data servers 12, as previously shown in connection with FIG. 1. The data servers 12 are generally federated systems controlled and maintained by an agency or organization that maintains selected informational content. The data servers 12 may be further divided into subsystems that maintain informational content of different types, or into subsystems that maintain predetermined levels of security for information maintained on the subsystem. For example, the data servers 12 may be subdivided into a secure (or restricted) portion 14 and a publicly accessible portion 16 that are separated by one or more firewall structures 18 to maintain the security of information residing on the restricted portion 14. The data servers 12 generally include an input/output capability (not shown) that permits one or more users to communicate with the data servers 12. The input/output capability may include, for example, a computer terminal that is directly coupled to the data servers 12. Alternately, the input/output capability may also include a personal computing device that is coupled to the data servers 12 through a communications system, such as a local area network (LAN), a wide area network (WAN), or even through a Public Internet connection.

The data servers 12 also include various "federated" data files. In the present discussion, "federated" informational content refers to information that resides on, and is under the control of a single one of the data servers 12. The federated information content may include, for example, component part or product specifications, digital representations of component parts and/or assemblies, text documents related to product assemblies, product and/or parts specifications, planning and/or management information and/or business-related documents, or other still other information.

The client data servers 12 are communicatively coupled to a distributed product system 32. The system 32 provides a centralized repository for selected lattice data structures that may, upon request, be accessed by clients 8. The system 32 also advantageously allows one of the data servers 12 to access information in one or more of the other data servers 12. Accordingly, the system 32 is operable to receive an information request from one or more of the clients 8 and to process the request. If the request is successfully processed by the system 32, the desired information that was the subject of the information request is returned to the requestor. If the system 32 fails to process the information request, the system 32 transmits a failure message to the client 8 that initiated the request.

With reference still to FIG. 2, the distributed product system 32 includes a memory portion that is configured to store a plurality of lattice structures. The lattice structure is generally an array structure that couples selected data to a corresponding node coordinate value. Accordingly, node values in the lattice structure indicate the position of the selected data. In one particular embodiment of the invention, the distributed product system 32 is configured to store one-dimensional lattice structures. In other embodiments, the system 32 may be configured to store two, three, or "n" dimensional lattice structures. In either case, the lattice structures stored by the system 32 may include uniform, perimetric and curvilinear lattice structures. The distributed product system 32 is also communicatively coupled to an applications infrastructure 24 that permits the clients 8 to access commonly used applications of various types.

Figure 3:
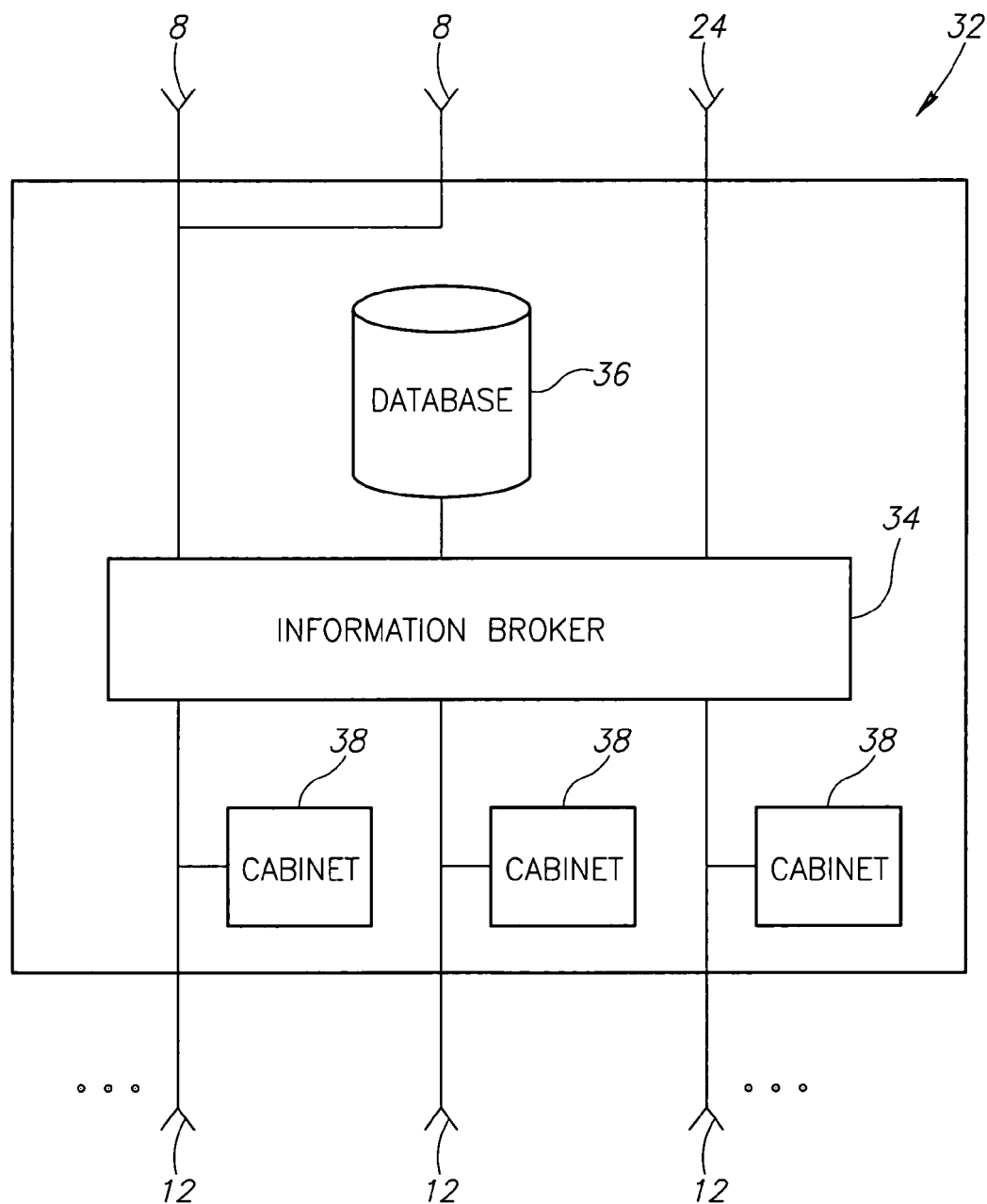
FIG. 3 is a schematic block view of the distributed product system of FIG. 2.

FIG. 3 is a schematic block view of the distributed product system 32 of FIG. 2 that will be used to describe the system 32 in greater detail. The system 32 includes an information broker 34 that is operable to receive information requests from the plurality of clients 8 and to process the request. In a particular embodiment, the informational request is communicated to the information broker 34 using the well-known extensible markup language common format (XML) that advantageously allows the sharing of data across different systems, particularly systems connected through the Internet. The information request includes key attributes such as a name, a source for the requested information (if known), a data type, a product number, or other suitable information.

The information broker 34 creates a product that includes the foregoing attributes, and instantiates the product. In the present context, "instantiates" is understood to mean finding at least one instance of a desired word or term, or the particular usage of the word or term. The information broker 34 instantiates the product to a database 36 that retains a plurality of lattice structures. The lattice structures include metadata or other similar content that corresponds to the attributes submitted in the information request. The information broker 34 may then generate other data structures that assist the user in navigating and viewing the desired information by selectively filtering the metadata present in the lattice structures. For example, the information broker 34 may generate one or more referential links that permits the desired information to be viewed. In a specific embodiment, the referential links may be hyperlinks. In any event, the navigational information is returned to the requesting client 8. When the information broker 34 instantiates the product to the database 36, a data server 12 that maintains the federated data may also be notified that an inquiry that stems from a client 8 has occurred. Accordingly, the system 12 that maintains the federated data may inform the requesting client 8 when a change to the federated data occurs at some future time.

Still referring to FIG. 3, the information broker 34 further includes a data cabinet 38 in communication with each of the data servers 12. The cabinets 38 may be used to temporarily store information sent from the information broker 34 prior to transferring the information to the requesting client 8. Alternately, the cabinets 38 may be used to sequester requested information that may be subject to security or proprietary restrictions. For example, a cabinet 38 that includes secure information may await the transfer of an appropriate security key prior to releasing the sequestered data.

Figure 4:
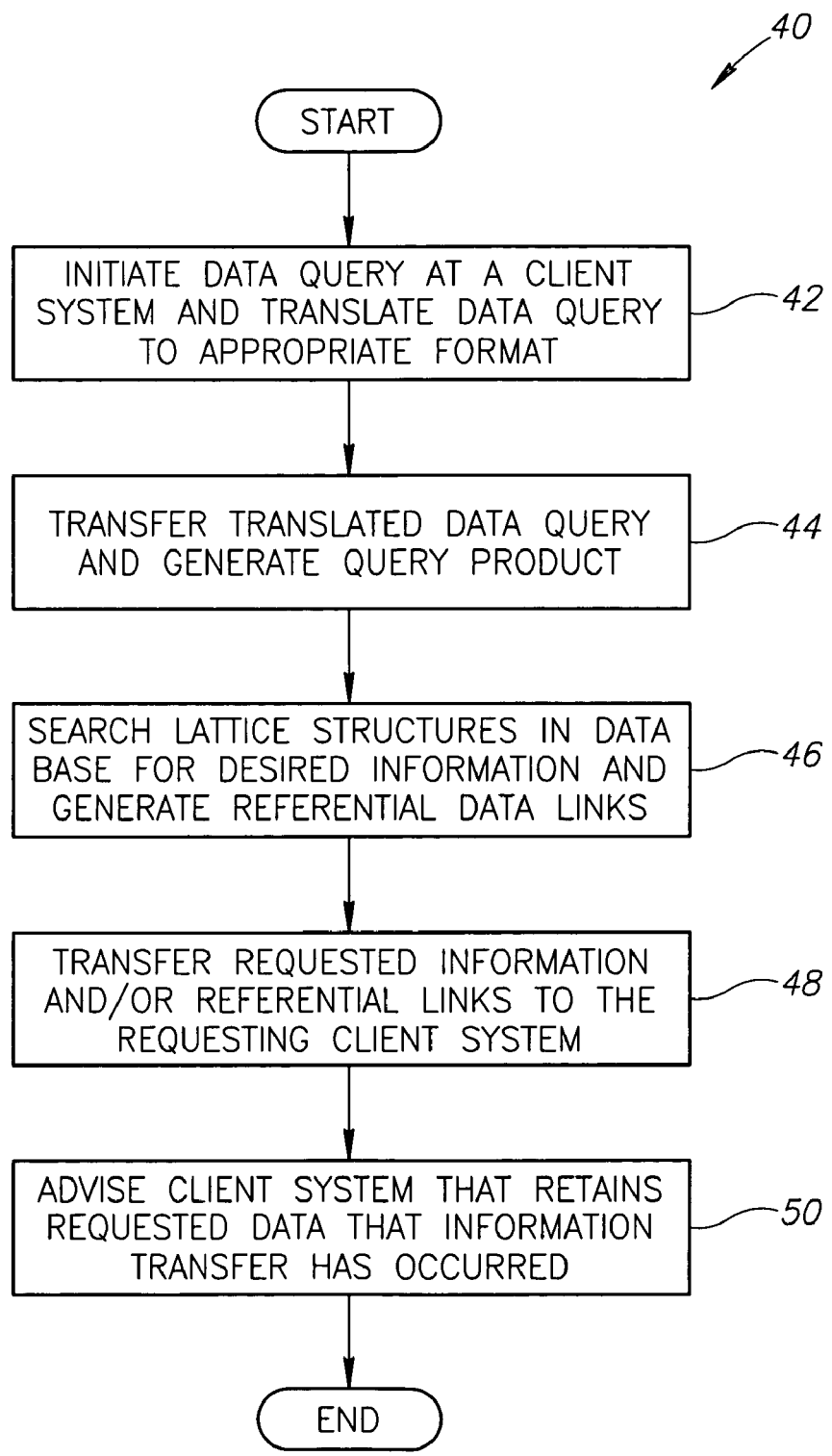
FIG. 4 is a flowchart that describes a method of managing a distributed database, according to another embodiment of the invention.

FIG. 4 is a flowchart that will be used to describe a method 40 of managing a distributed database, according to another embodiment of the invention. At block 42, a data query is initiated at a selected one of the clients 8 (as shown in FIG. 2 and FIG. 3). The data query may include a name, a source for the requested information, a data type, a product number, or other suitable information. The data query may then be converted into an appropriate format before it is transferred to the information broker 34 (as shown in FIG. 3). For example, the data query may be converted to the extensible markup language (XML), as discussed in detail above. At block 44, the formatted data query is transferred to the information broker 34, and a query product is generated. At block 46, lattice structures stored in the database 36 (also shown in FIG. 3) are searched relative to the query product. When the requested information is identified in the plurality of lattices stored in the database, one or many referential links may be requested by the information broker 34 allowing the information to be extended to other data servers and returned to the requesting client 8, as shown at block 48. At block 50, the one or more of the data servers 12 that retain the federated data is requested to retrieve and return the desired data to the information broker 34 that will return the result set back to the client 8.

The foregoing methods and systems may advantageously avoid several of the shortcomings present in the prior art. For example, the requirement for extensive data searching that extends into each of the data servers is avoided, since the search extends only to the lattice structures that include various nodes having metadata positioned at the nodes. The metadata thus serve as "placeholders" for the actual information. The foregoing methods and systems also advantageously avoid large, cumbersome middleware infrastructures generally required in distributed database structures. In particular, the requirement for agents, or "adaptor programs" is eliminated.

Still other advantages are readily apparent in the foregoing methods and systems. Since the data servers are relatively loosely coupled to the distributed product system, each of the data servers retains the ability to alter internal processes without affecting the operation of other data servers that operate within the distributed product system, thus enhancing partnering agility. General infrastructure benefits are also apparent, since process advantages occur in a collaborative and controlled process. For example, cycle times are shortened, since a search of each data servers is avoided. Moreover, since changes to metadata in the lattice structures are communicated to all users having a common interest in the information, the need for communicating revision information and data is advantageously avoided. Still further, the foregoing methods and systems advantageously avoid the need for a user to repeatedly enter identifying information, such as passwords and the like, as the user accesses different data servers.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of controlling access to federated informational content on a plurality of data servers, the method comprising:
   receiving a client request for information;
   searching a central repository of lattice structures for the requested information, the lattice structures configured to store data elements having inter-related information that includes node coordinate values, each node coordinate value indicating the location of data stored in a data file on one of the one or more of the data servers;
   using results of the search to create referential links to the requested information in one or more of the data servers;
   allowing a selected client to access the request information in one or more of the data servers via the links; and
   sequestering at least a portion of the requested information prior to allowing the client access from one or more of the data servers;
   wherein the servers include federated systems controlled and maintained by an entity that maintains selected informational content.

2. The method of claim 1, wherein the lattice structures are stored in a database.

3. The method of claim 1, wherein the lattice structures have at least one of a uniform, perimetric and curvilinear lattice structure.

4. The method of claim 1, wherein searching the lattice structures includes identifying at least one of a name, a source, a data type and a product number.

5. The method of claim 1, wherein searching the plurality of lattice structures further comprises filtering the lattice structures to identify a desired data element.

6. The method of claim 1, wherein the links include referential links data files.

7. The method of claim 6, wherein a referential link permits navigation to a data file.

8. The method of claim 6, wherein the referential links include hyperlinks.

9. The method of claim 1, wherein searching the repository includes generating a product that includes attributes of the client request.

10. The method of claim 1, wherein searching the repository includes filtering the lattice structure to identify a desired data element.

11. The method of claim 1, wherein allowing the access includes retrieving the requested information from a selected data server.

12. A distributed database management system, comprising:
    a plurality of data servers having processors federated informational content data sources and input/output capabilities that are configured to permit communications between a selected data server and a user; and
    a distributed product system for controlling user access to the federated informational content on the plurality of data servers, the distributed product system including computer-readable memory for storing:
    a database that is configured to store a plurality of lattice structures that include data elements, the data elements having node coordinate values, each node coordinate value indicating a location of data stored in the data servers; and
    an information broker operable to accept a data query from a client, search the database for information according to attributes included in the data query, use results of the search to locate information in one or more of the data servers, and allow a user to access the requested information in one or more of the data servers;
    whereby the information broker searches the database of lattice structures instead of the plurality of servers.

13. The system of claim 12, wherein the plurality of data servers comprises a firewall structure that is configured to separate a private portion of a selected client system from a public portion.

14. The system of claim 12, wherein the database is configured to store lattice structures having metadata located at nodes of the lattice structures.

15. The system of claim 12, wherein one or more of the client systems are coupled to a data cabinet operable to store information associated with the data query.

16. The system of claim 12, further comprising an applications infrastructure coupled to the distributed product system.

17. The system of claim 14, wherein the information broker further comprises a digital filter configured to filter the lattice structures to identify relevant metadata.

\* \* \* \* \*

UNITED STATES PATENT AND TRADEMARK OFFICE
CERTIFICATE OF CORRECTION

PATENT NO. : 7,577,663 B2  
APPLICATION NO. : 11/171154  
DATED : August 18, 2009  
INVENTOR(S) : Crispo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 272 days.

Signed and Sealed this

Seventh Day of September, 2010

David J. Kappos
*Director of the United States Patent and Trademark Office*